(12) United States Patent
Sherman et al.

(10) Patent No.: US 7,036,382 B2
(45) Date of Patent: May 2, 2006

(54) LIQUIDLESS SEAL CONNECTION

(75) Inventors: David L. Sherman, Guilford, CT (US);
Tyler J. Bessette, Milford, CT (US)

(73) Assignee: Ashcroft, Inc., Stratford, CT (US)

( * ) Notice: Subject to any disclaimer, the term of this patent is extended or adjusted under 35 U.S.C. 154(b) by 85 days.

(21) Appl. No.: 10/696,126

(22) Filed: Oct. 29, 2003

(65) Prior Publication Data

US 2004/0200289 A1  Oct. 14, 2004

Related U.S. Application Data

(60) Provisional application No. 60/461,968, filed on Apr. 10, 2003.

(51) Int. Cl.
*G01L 7/08* (2006.01)

(52) U.S. Cl. .......................... 73/715; 73/753

(58) Field of Classification Search ........... 73/700–756
See application file for complete search history.

(56) References Cited

U.S. PATENT DOCUMENTS

| | | | |
|---|---|---|---|
| 4,246,908 A | | 1/1981 | Inagaki et al. |
| 4,283,954 A | * | 8/1981 | Echtler et al. ................. 73/706 |
| 5,303,596 A | | 4/1994 | Rickman |
| 5,665,920 A | * | 9/1997 | Martin ........................ 73/715 |
| 5,693,887 A | | 12/1997 | Englund et al. |
| 5,875,413 A | * | 2/1999 | Vinci ........................... 702/91 |

FOREIGN PATENT DOCUMENTS

EP  0 825 428 A2  2/1998

OTHER PUBLICATIONS

Ashcroft Type 320 Quick-Connect Sanitary diaphragm Seal, Dresser Instrument Division Bulletin DS-5 (10/04).
Ashcroft Type 1032 Sanitary Pressure Gauge, Dresser Measurement & Control Bulletin SG-2 (6/96).
Ashcroft Type 311/312 All-Welded Midi Diaphragm Seal, Dresser Instruments Bulletin DS-8 (7/99).
Ashcroft Type 330 Flush Mini Diaphragm Seal Dresser Instruments Bulletin DS-9 (11/97).
International Search Report dated Sep. 16, 2004 for PCT/US2004/008142.
Project Data Sheet on Sensotec Sensor Model JP dated copyright 2002 and available from website www.sensotec.com.

* cited by examiner

*Primary Examiner*—Max Noori
*Assistant Examiner*—Jermaine Jenkins
(74) *Attorney, Agent, or Firm*—Fish & Richardson P.C.

(57) ABSTRACT

A pressure instrument may include a seal connection connecting a pressure gauge to a process. A pressure sensor located in a base of the seal connection is in data communication with the pressure gauge that is spaced apart from the pressure sensor. Embodiments are particularly applicable on sanitary seal connections or where a low measuring range or high accuracy is required. Embodiments can include, for example, digital pressure gauges, pressure transducers and transmitters with any seal connection.

40 Claims, 2 Drawing Sheets

LIQUIDLESS SEAL CONNECTION

CROSS REFERENCE TO RELATED APPLICATIONS

This application claims the benefit of priority from U.S. Provisional Application entitled "Liquidless Seal Connection", filed Apr. 10, 2003, Application Ser. No. 60/461,968, the disclosure of which is incorporated by reference.

FIELD OF THE INVENTION

The description relates in general to electronic instrument connections, and in particular to digital gauges for sensing characteristics of a process media.

BACKGROUND OF THE INVENTION

Pressure gauges to measure the pressure of process media are well known. A sensor for a gauge is conveniently located inside the gauge and, in some cases, is in communication with the process media through a narrow passageway in the gauge stem. Various process media are damaging to gauges, and the process media may become clogged in the passageway between the process and the gauge sensor. As a result, seals are sometimes used to isolate the process media from the gauge system. The seal is filled with a fill media which is typically glycerin, silicone, or other liquid to transmit the process pressure to the gauge. The disadvantage of this seal approach with any gauge seal assembly is that the fill media in the seal will expand or contract with temperature changes. This results in errors in the gauge pressure reading.

SUMMARY OF THE INVENTION

An improved design over conventional digital pressure gauges with a diaphragm seal connection. The improved design results in more accurate pressure measurements than the current diaphragm seal approach, and eliminates the risk of liquid leaks. One embodiment of the invention is directed toward sanitary seal connections or where a low measuring range or high accuracy is required. Embodiments can include digital pressure gauges, pressure transducers, and transmitters with any seal connection, and other variations.

The design may be seal-diaphragmless. For example, the embodiment does not have a separate seal diaphragm covering the gauge sensor. Pressures are therefore measured directly and more accurately.

Another embodiment does not require a fill liquid to transmit pressure changes of the process media to the pressure sensor. Providing a seal devoid of fill media between the sensor and the process media eliminates the errors due to expansion and contraction of the fill liquid caused by temperature changes. The potential for a leak of fill liquid is also eliminated.

In one general aspect, a diagnostic instrument for measuring a parameter of process media of a process may include a seal connection. The seal connection may include a base diaphragmlessly-sealed to the process and a body extending from the base to a distal end spaced apart from the base. A sensor may be located at the base to sense the process media parameter and transmit a signal indicative of the sensed parameter. A diagnostic-output device may be positioned at the distal end apart from the sensor and adapted to receive the signal indicative of the sensed parameter. The body preferably defines a cavity and the cavity is devoid of media fill. The diagnostic-output device is, in one embodiment, a pressure gauge responsive to electrical signals and the signal indicative of the sensed parameter is an electrical signal.

In another general aspect, a process instrument may be used to measure the pressure of process media in a process. The instrument may include a pressure gauge stem, a pressure sensor, and a pressure gauge. The pressure gauge stem may include a proximal end for connecting to a process and a body extending from the proximal end to a distal end. The pressure sensor may be located at the proximal end to sense pressure of the process media and transmit a pressure signal indicative of the sensed pressure of the process media. The pressure gauge may be positioned at the distal end of the pressure gauge stem apart from the pressure sensor and may be adapted to receive the pressure signal.

In another general aspect, pressure may be measured in a process media by positioning a pressure gauge at a distal end of a gauge stem and positioning a pressure sensor at a proximal end of the gauge stem. The pressure sensor may be spaced apart from the pressure gauge, and the gauge stem may be connected to a process such that the pressure sensor is in operable communication with the process media. A pressure signal may be transmitted from the pressure sensor via transmission conduits to the pressure gauge.

Pressure of a process media may also be measured by positioning a pressure gauge apart from the process media and positioning a pressure sensor in operable communication with the process media to sense pressure changes of the process media. The pressure sensor may be positioned apart from the pressure gauge, and a pressure signal based on the sensed pressure may be transmitted from the pressure sensor to the pressure gauge.

DETAILED DESCRIPTION OF THE ILLUSTRATED EMBODIMENT

Figure 2:
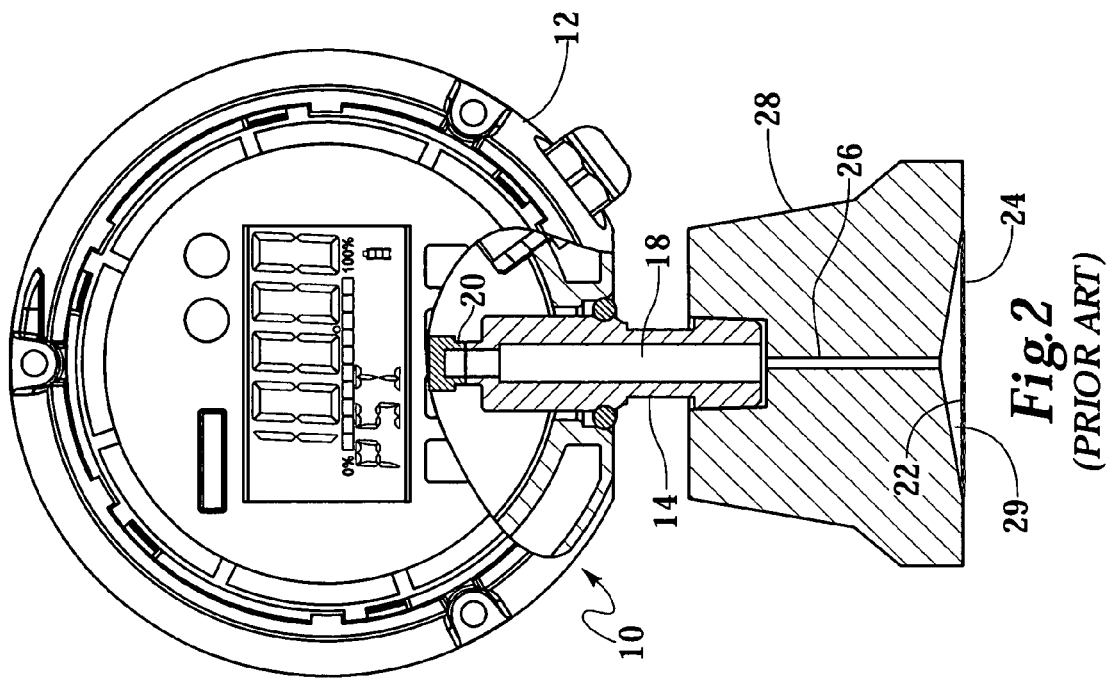
FIG. 2 illustrates a conventional pressure gauge with a diaphragm seal.
Figure 1:
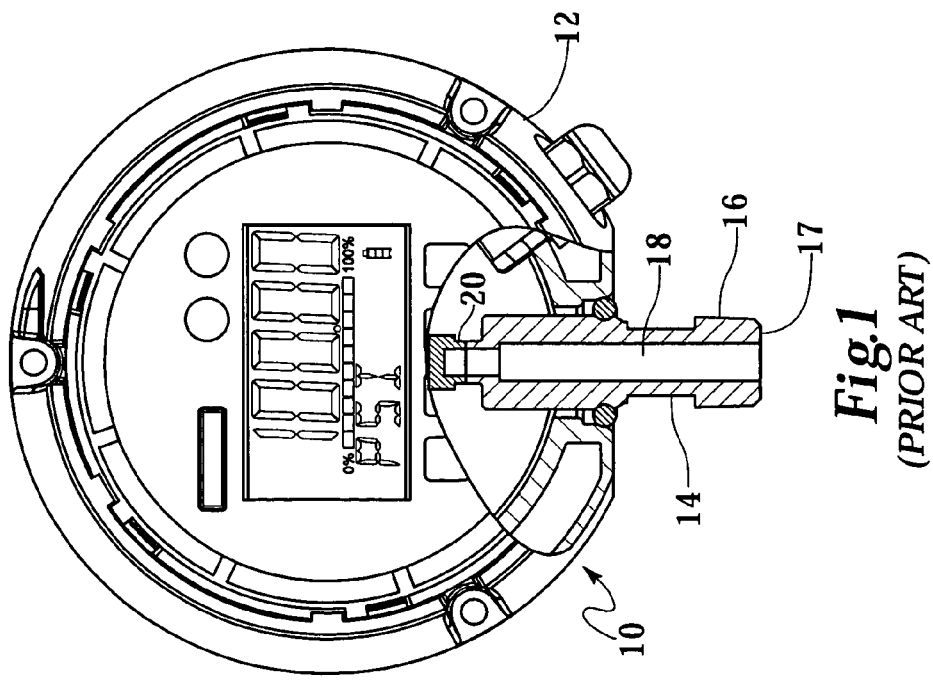
FIG. 1 illustrates a conventional digital pressure gauge with a gauge stem.
Figure 5:
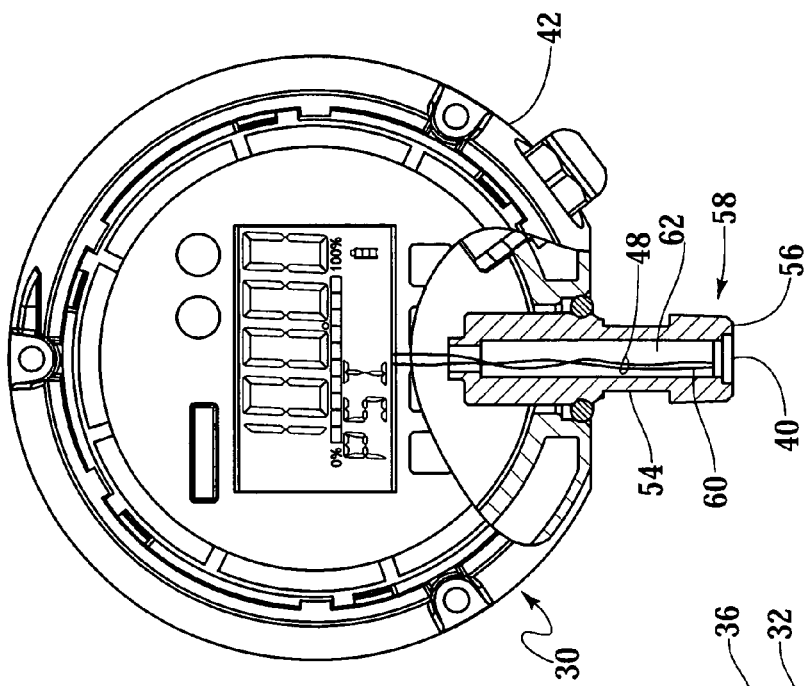
FIG. 5 illustrates a digital pressure gauge with the sensor positioned at the base of the stem
Figure 3:
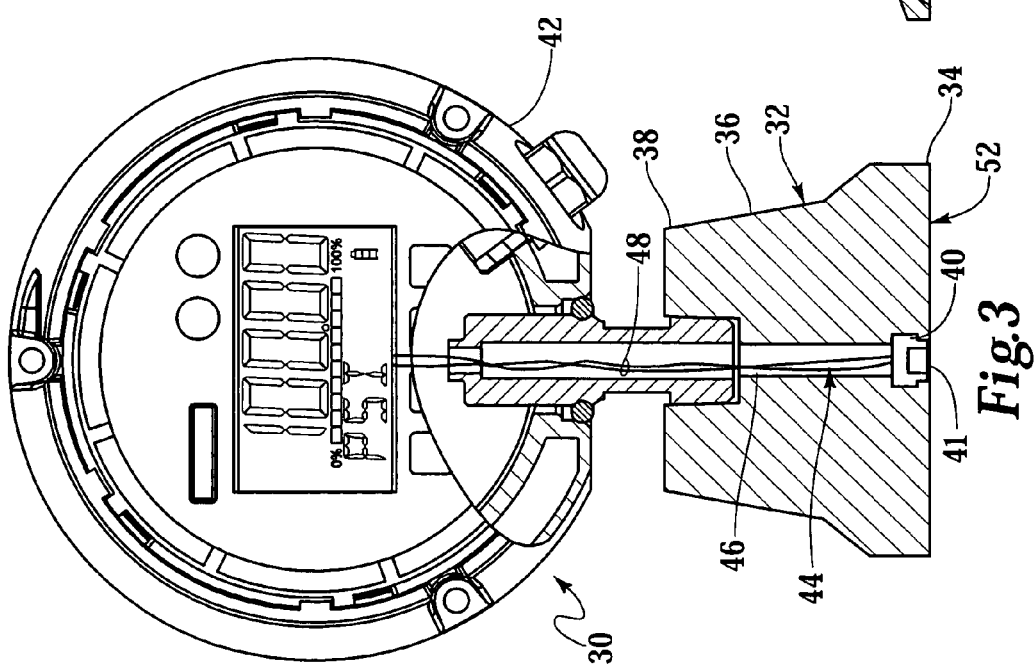
FIG. 3 illustrates a digital pressure gauge with the sensor positioned at the base of the seal.

FIGS. 1 and 2 illustrate a conventional pressure instrument 10 comprising a digital pressure gauge 12. The illustrated embodiments in FIGS. 3 and 5 are digital pressure gauges that represent improvements over pressure gauges that include a passageway in the gauge stem through which process media communicates with the gauge sensor, such as shown in FIG. 1, and pressure gauges with a diaphragm seal connection, such as shown in FIG. 2.

With reference to FIG. 1, in a typical digital pressure gauge 12, a stem 14 projects from the pressure gauge 12. The stem 14 may be used to connect the pressure gauge 12 to a process using, for example, a threaded portion (not shown) at the distal portion 16 of the stem 14. A passageway 18 extends from the base 17 of the stem 14 to a sensor 20 inside the pressure gauge 12. When the pressure gauge 12 is connected to a process, process media fills the passageway 18 and exerts pressure on the sensor 20. A disadvantage of this design is that the process media may become clogged in the passageway 18.

To overcome this disadvantage, some existing products combine a digital pressure gauge with a standard liquid filled diaphragm seal. In these existing products both the diaphragm and the fill liquid add a significant amount of measurement error. In addition, the fill liquid can potentially leak.

With reference to FIG. 2, in a typical diaphragm seal application, a thin, flexible diaphragm 22 is installed such that it makes contact with the process media 24. When the diaphragm 22 flexes in response to the pressure of the process media, the diaphragm 22 transmits the pressure to the seal fill media contained in the passageway 18 of the gauge stem 14, in a passageway 26 of a seal connection 28, and in a cavity 29 between the diaphragm 22 and the seal connection passageway 26. The fill media in turn transmits pressure to the sensor 20. There are three distinct disadvantages of this design: (1) errors due to the diaphragm; (2) errors due to media expansion; and (3) leakage of media fill.

There are two measurement problems associated with the diaphragm. The modulus of elasticity of the diaphragm typically changes over large temperature ranges. The change results in the diaphragm being less responsive at cold temperatures. Thus the device is not as sensitive to pressure changes at cold temperatures. Another measurement error related to the physical properties of the diaphragm is that a stiff diaphragm does a poor job of transmitting low pressures. Thus, such a device will not be sensitive at low pressure ranges.

Measurement errors are also related to thermal expansion of the fill fluid. All fill fluids expand as ambient temperature increases. This causes a false change in pressure measured by the gauge. The amount of error depends on the temperature change, type of fill fluid, and the specific seal configuration. Where the pressure being measured is low (less than 15 psi) the error can be significant as a percent of the total gauge reading. Thus, when pressure measurements are needed in a low range over a large temperature range, the measurement errors resulting from the diaphragm couple with the measurement errors resulting from thermal expansion of the fill fluid. Therefore, accurate measurements over low pressure ranges are particular difficult to achieve with conventional devices.

Leakage is the third major disadvantage with conventional devices. Depending on their designs, most standard diaphragm seals can potentially leak fill fluid. This leakage can lead to a degradation of response. Another leakage problem is the fluid escaping into the environment in which the device is located. Depending on the environment and the fill media, this escape can range from simple annoyance to severe impact and, in some cases, injury to personnel.

FIG. 3 illustrates a process instrument 30 for measuring pressure of process media in a process. The instrument 30 comprises a seal connection 32 comprising a base 34 sealed to the process and a body 36 extending from the base 34 to a distal end 38 spaced apart from the base 34. A pressure sensor 40 is located at the base 34 to sense pressure of the process media and transmit a pressure signal indicative of the sensed pressure of the process media. A pressure gauge 42 is positioned at the distal end 38 of the seal connection 32 apart from the pressure sensor 40 and adapted to receive the pressure signal.

A transmission conduit 44 connects the pressure sensor 40 to the pressure gauge 42, wherein the pressure signal is transmitted via the transmission conduit 44 to the pressure gauge 42. The body 36 of the seal connection 32 defines a cavity 46 and the transmission conduit 44 is located in the cavity 46. The cavity 46 is devoid of media fill. In the illustrated embodiment of instrument 30, the pressure signal is an electrical signal and the transmission conduit comprises one or more wires 48. Other structure, for example, optical structure, can be used to transmit the pressure signal, or other diagnostic signal, to the gauge.

The pressure sensor 40 is relocated from the pressure gauge 42 to the base 34 of the seal connection 32, and takes the place of the seal diaphragm 22. The sensor 40 is welded into a pocket 50 (see FIG. 4) in the base 34 of the seal connection 32, and the measurement is transmitted to the gauge via wires 48 through the seal connection 32 into the gauge 42. The interface to the process is still a flush surface, but no fill media or diaphragm is required, therefore all three disadvantages above are eliminated.

One embodiment is directed toward a sanitary seal, as these applications typically require a flush interface between the instrument 30 and the process, but do not necessarily require the need to remove the gauge 42 from the seal 32. This flush interface eliminates pockets that could become clogged with the process media or would be difficult to clean. Aspects of the invention may also be implemented in cases where a sanitary seal is not required. Other types of seals or unsealed connections may also be used. Implementations of the invention may be used in place of any application of a digital pressure gauge with a diaphragm seal connection, or any transducer or transmitter requiring a diaphragm seal connection. Although the figures depict implementations in which the output of a sensor 40 is attached to a digital pressure gauge, the invention may also be implemented by attaching the output of the sensor 40 to a transducer or transmitter (e.g., via wires 48).

Figure 4:
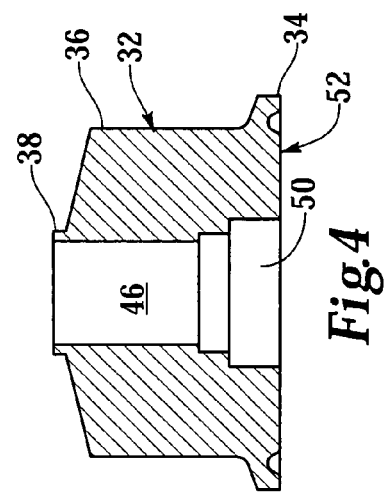
FIG. 4 illustrates a seal connection with the sensor removed to illustrate a pocket for receiving the sensor.

For some applications, the base 34 is flush-sealed to the process to form an interface comprising a flush surface 52, and the interface is seal-diaphragmless (i.e., the seal is made without use of a diaphragm). The base 34 may comprise a pocket 50 in which the sensor 40 is secured. FIG. 4 illustrates a seal connection 32' better illustrating the pocket 50. The sensor 40 may comprise a sensor diaphragm 41 regardless of whether the seal diaphragm 22 is present.

Another embodiment is directed toward a process instrument for measuring pressure of a process media of a process. The instrument comprises a base 32 sealed to the process; and a body 36 extending from the base 34 to a distal end 38 spaced apart from the base 34. The body 36 defines a cavity 46 devoid of media fill. A pressure sensor 40 is located at the base 34 to sense pressure of the process media and transmit a signal indicative of the sensed pressure. A pressure gauge 42 is positioned at the distal end 38 apart from the pressure sensor 40 and responsive to the signal indicative of the sensed pressure.

One or more wires 48 may connect the pressure gauge 42 and the pressure sensor 40, and the signal indicative of the pressure of the process media is transmitted to the pressure gauge 42 via the one or more wires 48. The pressure sensor 40 may be placed in direct contact with the process media, and the base 34 and the pressure sensor 40 can be flush-sealed to the process. At least for sanitary applications, the base 34 and the pressure sensor 40 are preferably sufficiently flush-sealed (see FIG. 3) to eliminate substantially all clog-susceptible pockets.

FIG. 5 illustrates an alternative embodiment of a process instrument 30 for measuring pressure of process media in a process. The instrument includes a pressure gauge 42 attached to a distal end of a gauge stem 54. A pressure sensor 40 is located at a stem base 56 at a proximal end 58 of the gauge stem 54. The pressure sensor 40 senses pressure of the process media and transmits a pressure signal indicative of the sensed pressure to the pressure gauge 42.

A transmission conduit 60 connects the pressure sensor 40 to the pressure gauge 42, wherein the pressure signal is transmitted via the transmission conduit 44 to the pressure gauge 42. The gauge stem 54 defines a cavity 62 and the transmission conduit 44 is located in the cavity 62. The cavity 62 is devoid of media fill. In the illustrated embodiment of instrument 30, the pressure signal is an electrical signal and the transmission conduit comprises one or more wires 48. Other structure, for example, optical structure, can be used to transmit the pressure signal, or other diagnostic signal, to the gauge.

The pressure sensor 40 is relocated from the pressure gauge 42 to the stem base 56 of the gauge stem 54. The sensor 40 may be welded into a pocket in the stem base 56 similar to the pocket 50 in the base 34 of the seal connection 32, as shown in FIG. 4. The measurement is transmitted to the pressure gauge 42 via wires 48 through the gauge stem 54 into the pressure gauge 42. The pressure sensor 40 may be flush or substantially flush with the stem base 56 and, depending on how the instrument connects to process, the interface to the process may be a flush surface, but no fill media or diaphragm is required.

One possible embodiment is directed toward an application in which it is desirable to install the pressure gauge 42 in a standard pipe connection or other type of connection and to be able to remove the gauge 42 from a standard pipe connection or other type of connection. The sensor 40 may comprise a sensor diaphragm 41.

One or more wires 48 may connect the pressure gauge 42 and the pressure sensor 40, and the signal indicative of the pressure of the process media is transmitted to the pressure gauge 42 via the one or more wires 48. The pressure sensor 40 may be placed in direct contact with the process media, and the stem base 56 and the pressure sensor 40 can be flush-sealed to the process.

In at least most applications, a critical factor impacting which uses are appropriate for a given diagnostic instrument, for example a pressure gauge, is the pressure range and accuracy required of the measurement. In applications where the pressure range is low (typically less than 15 psi), the inherent error in a standard (conventional) diaphragm seal is excessive compared to the range of the measurement. Embodiments of the invention are particularly advantageous in these low-range applications. Embodiments of the invention are also advantageous where high accuracy is required of a seal connection at any pressure range. Some embodiments are advantageous, as compared to conventional gauges, over both low pressure ranges and high pressure ranges across broad temperature ranges.

One method is directed toward measuring pressure of a process media of a process. The method comprises positioning a pressure gauge apart from the process media; and positioning a pressure sensor in operable communication with the process media to sense pressure changes of the process media. The pressure sensor is positioned apart (e.g., remotely) from the pressure gauge. A pressure signal based on the sensed pressure is transmitted from the pressure sensor to the pressure gauge. The method may include sealing a base of a seal connection to the process. The pressure gauge can be positioned at a distal end of the seal connection, and the pressure sensor can be positioned at a base of the seal connection. Preferably, a fill-media-free environment is maintained between the pressure sensor and the pressure gauge.

While particular embodiments and applications of the present invention have been illustrated and described, it is to be understood that the invention is not limited to the precise construction and compositions disclosed herein and that various modifications, changes, and variations may be apparent from the foregoing descriptions without departing from the invention as defined in the appended claims.

What is claimed is:

1. A process instrument for measuring pressure of process media in a process, the instrument comprising:
    a seal connection comprising a base sealed to the process and a body extending from the base to a distal end spaced apart from the base;
    a transducer located at the base to sense pressure of the process media and transmit an electrical signal indicative of the sensed pressure of the process media; and
    a pressure gauge positioned at the distal end of the seal connection apart from the transducer and adapted to receive the electrical signal.

2. The process instrument of claim 1 comprising a transmission conduit connecting the transducer to the pressure gauge, wherein the electrical signal is transmitted via the transmission conduit to the pressure gauge.

3. The process instrument of claim 2 wherein the body of the seal connection defines a cavity and the transmission conduit is located in the cavity.

4. The process instrument of claim 3 wherein the cavity is devoid of fill liquid.

5. The process instrument of claim 2 wherein the transmission conduit comprises one or more wires.

6. The process instrument of claim 1 wherein the base is flush-sealed to the process to form an interface comprising a flush surface.

7. The process instrument of claim 6 wherein the interface is diaphragm-less between the transducer and the process.

8. The process instrument of claim 7 wherein the transducer comprises a sensor diaphragm.

9. The process instrument of claim 1 wherein the transducer comprises a sensor seal in direct contact with the process media.

10. The process instrument of claim 1 wherein the base comprises a pocket and the transducer is secured in the pocket.

11. The process instrument of claim 1 wherein the gauge is a digital gauge.

12. The process instrument of claim 1 wherein the transducer forms a substantially flush surface with the base.

13. A diagnostic instrument for measuring a parameter of process media of a process, the instrument comprising:
    a seal connection comprising:
    a seal-diaphragmless base sealed to the process, and
    a body extending from the base to a distal end spaced apart from the base;
    a transducer disposed substantially flush with the base to sense the process media parameter and transmit an electrical signal indicative of the sensed parameter; and
    a diagnostic-output device positioned at the distal end apart from the sensor and adapted to receive the electrical signal.

14. The instrument of claim 13 wherein the body defines a cavity and the cavity is devoid of fill liquid.

15. The instrument of claim 13 wherein the diagnostic-output device is a pressure gauge responsive to electrical signals.

16. A process instrument for measuring pressure of a process media of a process, the instrument comprising:
- a base sealed to the process;
- a body extending from the base to a distal end spaced apart from the base, wherein the body defines a cavity devoid of fill liquid;
- a pressure sensor located substantially flush with the base to sense pressure of the process media and transmit a signal indicative of the sensed pressure; and
- a pressure gauge positioned at the distal end apart from the pressure sensor and responsive to the signal indicative of the sensed pressure.

17. The instrument of claim 16 wherein the pressure gauge is a digital pressure gauge.

18. The instrument of claim 17 wherein the pressure sensor comprises a transducer and the instrument further comprises one or more wires connecting the pressure gauge and the pressure sensor, wherein the signal indicative of the pressure of the process media is transmitted to the pressure gauge via the one or more wires.

19. The instrument of claim 16 wherein the pressure sensor is in direct contact with the process media.

20. The instrument of claim 19 wherein the base and the pressure sensor are flush-sealed to the process.

21. The instrument of claim 20 wherein the base and the pressure sensor are sufficiently flush-sealed to eliminate substantially all clog-susceptible pockets.

22. The instrument of claim 16 wherein the pressure sensor comprises a sensor diaphragm in direct contact with the process media.

23. The instrument of claim 16 wherein the base comprises a seal diaphragm between the pressure sensor and the process media and the seal diaphragm is adjacent the pressure sensor.

24. The instrument of claim 23 wherein the pressure sensor comprises a sensor diaphragm in direct contact with seal diaphragm.

25. The instrument of claim 23 wherein the seal diaphragm is sufficiently flush-sealed to the process to substantially eliminate clog-susceptible pockets.

26. A method of measuring pressure of a process media of a process, the method comprising:
- positioning a pressure gauge apart from the process media;
- positioning a pressure sensor in operable communication with the process media to sense pressure changes of the process media;
- sealing a base of a seal connection to the process;
- positioning the pressure sensor apart from the pressure gauge, wherein the pressure sensor forms a substantially flush surface with the base; and
- transmitting an electrical signal based on the sensed pressure from the pressure sensor to the pressure gauge.

27. The method of claim 26 comprising:
- positioning the pressure gauge at a distal end of the seal connection;
- and maintaining a fill-liquid-free environment between the pressure sensor and the pressure gauge.

28. The method of claim 27 wherein a cavity in a body of the seal connection defines the fill-liquid-free environment; and the method comprises transmitting the electrical signal through the cavity.

29. The method of claim 28 comprising transmitting the electrical signal via one or more wires connecting the pressure gauge and the pressure sensor.

30. The method of claim 27 comprising positioning one or more wires in a body of the seal connection, wherein the electrical signal is transmitted to the pressure gauge via the one or more wires.

31. The method of claim 26 comprising positioning a seal diaphragm between the pressure sensor and the process media.

32. The method of claim 31 comprising preventing fill-liquid from separating the pressure sensor and the seal diaphragm.

33. The method of claim 26 wherein the pressure sensor is provided with a sensor diaphragm.

34. The method of claim 26 comprising placing the pressure sensor in direct communication with the process media.

35. The method of claim 26 wherein positioning the pressure sensor apart from the process media comprises connecting the pressure sensor to a distal end of a stem and connecting a proximal end of the stem to the process, the method further comprising positioning the pressure sensor at the proximal end of the stem.

36. The method of claim 35 wherein a cavity in a body of the stem defines the fill-liquid-free environment; and the method comprises transmitting the electrical signal through the cavity.

37. The method of claim 26 further comprising transmitting the electrical signal via one or more wires connecting the pressure gauge and the pressure sensor.

38. The method of claim 35 further comprising positioning one or more wires in a body of the stem, wherein the electrical signal is transmitted to the pressure gauge via the one or more wires.

39. A method of measuring pressure of a process media, the method comprising:
- sealing a base of a seal connection to the process;
- positioning a pressure gauge at a distal end of the seal connection;
- positioning a pressure sensor at the base of the seal connection in operable communication with the process media;
- spacing the pressure sensor apart from the pressure gauge; and
- transmitting a pressure signal from the pressure sensor via a transmission conduit to the pressure gauge, the transmission conduit being substantially fill-media-free.

40. The method of claim 35 comprising placing the pressure sensor in direct contact with the process media.

* * * * *